United States Patent [19]
Tanisawa

[11] Patent Number: 5,960,651
[45] Date of Patent: *Oct. 5, 1999

[54] THEFT PREVENTION MECHANISM FOR INFORMATION PROCESSING APPARATUS

[75] Inventor: Hiroyuki Tanisawa, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/059,705

[22] Filed: Apr. 14, 1998

[30] Foreign Application Priority Data

Nov. 7, 1997 [JP] Japan ................................. 9-306079

[51] Int. Cl.⁶ ................................................. E05B 73/00
[52] U.S. Cl. ................................. 70/14; 70/58; 70/168; 361/683; 340/568.1; 340/571; 340/693.4; 340/693.5; 340/568.2
[58] Field of Search ........................... 340/568.2, 568.1, 340/571, 693.9, 693.5; 70/14, 58, 168; 361/683, 726; 369/292, 77.2; 360/86, 97.01

[56] References Cited

U.S. PATENT DOCUMENTS

| | | | |
|---|---|---|---|
| 4,794,587 | 12/1988 | Cordiano | 369/292 |
| 4,898,009 | 2/1990 | Lakoski et al. | 70/58 |
| 5,361,610 | 11/1994 | Sanders | 70/14 |
| 5,673,573 | 10/1997 | Green | 70/14 |
| 5,687,592 | 11/1997 | Penniman et al. | 70/14 |
| 5,757,616 | 5/1998 | May et al. | 361/683 |

FOREIGN PATENT DOCUMENTS

| | | |
|---|---|---|
| 2-52782 | 2/1990 | Japan . |
| 3-183061 | 8/1991 | Japan . |
| 5-75974 | 10/1993 | Japan . |
| 8-171960 | 7/1996 | Japan . |
| 8-250208 | 9/1996 | Japan . |
| 9-6493 | 1/1997 | Japan . |

*Primary Examiner*—Benjamin C. Lee
*Attorney, Agent, or Firm*—Staas & Halsey

[57] ABSTRACT

A theft prevention mechanism is effective to prevent not only a portable information processing apparatus but also a PC card inserted therein from being stolen. The theft prevention mechanism has a main body of the information processing apparatus having a slot for insertion of a PC card therein, a card lock slidably mounted on the main body for sliding movement between a first position in which the card lock allows the PC card to be inserted into the slot and a second position in which the card lock prevents the PC card inserted in the slot from being removed from the slot, an oblong hole defined in the main body adjacent to the card lock, and a theft prevention tool engageable in the oblong hole for preventing the information processing apparatus from being stolen. The theft prevention tool has an engaging tip integrally formed with an inner lock member. When the engaging tip is inserted in the oblong hole and the inner lock member is rotated into a locked position within an outer lock member, the engaging tip is prevented from being removed from the oblong hole, and the outer lock member abuts against the card lock which has been shifted to the second position for preventing the card lock from being shifted to the first position.

19 Claims, 11 Drawing Sheets

F I G. 1 1 A
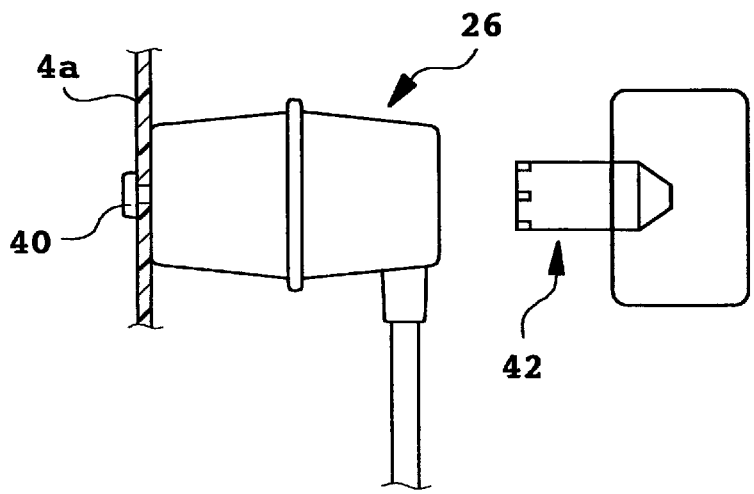
F I G. 1 1 B
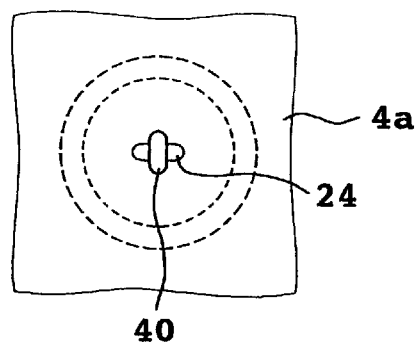
F I G. 1 1 C
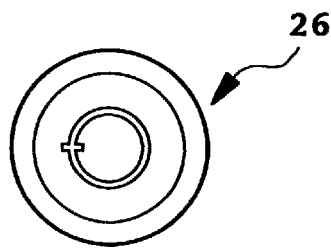

THEFT PREVENTION MECHANISM FOR INFORMATION PROCESSING APPARATUS

BACKGROUND OF THE INVENTION

1. Field of the Invention

The present invention relates to a theft prevention mechanism for use with a portable information processing apparatus, and more particularly to a theft prevention mechanism for preventing both a portable information processing apparatus and a card such as a PC card or the like which is housed in the portable information processing apparatus, from being stolen.

2. Description of the Related Art

As information processing apparatus are becoming smaller in size and capable of performing more and more functions, portable information processing apparatus are now finding widespread use at a rapid rate. While portable information processing apparatus are compact and can be carried around easily, they are subject to the danger of getting stolen because they are light and not bulky. It is therefore preferable for portable information processing apparatus to have a theft prevention mechanism.

Notebook personal computers, which are one type of portable information processing apparatus, are designed in a relatively small size and at a low cost, and hence the number of accessories that can be combined as standard units with notebook personal computers upon their shipment is limited. After having purchased a notebook personal computer, therefore, many users find it necessary to buy and add required expansion devices to the notebook personal computer by themselves to obtain desired functions from the notebook personal computer.

If a user wants to add an expansion device, such as an adapter card, to a personal computer having a relatively large space in its housing, e.g., a desktop personal computer, then the user simply inserts the adapter card into an expansion slot on a system board in the housing. However, it is not practically feasible to add such an adapter card to a notebook personal computer because the packing density in the housing of the notebook personal computer is very high and no sufficient space is available in the housing. A personal computer card (PC card) is an expansion device of a credit card size, which has been developed to improve the expansibility of notebook personal computers whose housing space availability is highly limited.

Minimum hardware (i.e., mechanical and electrical) guidelines for PC cards have been developed as international standards jointly by the Personal Computer Memory Card International Association (PCMCIA) and the Japan Electronic Industry Development Association (JEIDA). At present, three types of PC cards are available, including Type 1 having a thickness of 3.3 mm, Type 2 having a thickness of 5 mm, and Type 3 having a thickness of 10.5 mm. Type-1 PC cards are mainly used as memory cards. Type-2 PC cards are used as facsimile modems, Ethernet adapters, SCSI adapters, etc. Type-3 PC cards are mainly used as cards with built-in hard disks.

Such PC cards have been made possible by the technologies available to reduce the size of electronic parts, and meet requirements for smaller, lighter, and portable notebook personal computers and lower power requirements for notebook personal computers. Presently, almost all notebook personal computers have a PC card slot as a standard slot. Use of PC cards is not limited to notebook personal computers, and desktop personal computers with a PC card slot have recently found their way into the market.

In the summer of 1994, the U.S. government has mandated to include PC card slots on all desktop personal computers procured for governmental use. Therefore, not only notebook personal computers, but also desktop personal computers are becoming a large market for PC cards. Currently, PC cards are more expensive than adapter cards. However, when the market for PC cards is expanded, they will be mass-produced and possibly become cheaper than adapter cards.

The recent expanded market for PC cards is bringing the security of PC cards, which has heretofore escaped much attention, into focus. However, the PCMCIA and the JEIDA have not prescribed anything so far for the security of PC cards. One conventional theft prevention mechanism for portable personal computers comprises a theft prevention tool coupled to a portable personal computer for preventing the portable personal computer from being stolen. Specifically, the conventional theft prevention mechanism has an oblong hole defined in the housing of the portable personal computer, and the theft prevention tool engages in the oblong hole and is locked to prevent the portable personal computer from being stolen.

Several mechanisms for preventing unauthorized removal of a PC card from a notebook personal computer have been proposed in the art. These PC card theft prevention mechanisms are complex, and are independent of theft prevention mechanisms for portable information processing apparatus. Inasmuch as theft prevention mechanisms for portable information processing apparatus and theft prevention mechanisms for PC cards have conventionally been independent of each other, portable information processing apparatus which are equipped with both theft prevention mechanisms have been expensive to manufacture.

SUMMARY OF THE INVENTION

It is therefore an object of the present invention to provide a theft prevention mechanism of simple structure which is capable of preventing an information processing apparatus and a card such as a PC card from being stolen.

In accordance with an aspect of the present invention, there is provided a theft prevention mechanism for use with an information processing apparatus, comprising a main body of the information processing apparatus having a slot for insertion of a card therein, a card lock slidably mounted on the main body for sliding movement between a first position in which the card lock allows the card to be inserted into the slot and a second position in which the card lock prevents the card inserted in the slot from being removed from the slot, an oblong hole defined in the main body adjacent to the card lock, and a theft prevention tool having an outer lock member, an inner lock member rotatably inserted in the outer lock member for rotation between a locked position and an unlocked position, an engaging tip integrally formed with the inner lock member and smaller than and similar in shape to the oblong hole, and a strap connected to the outer lock member. When the engaging tip is inserted in the oblong hole and the inner lock member is rotated into the locked position, the engaging tip is prevented from being removed from the oblong hole, and the outer lock member abuts against the card lock shifted to the second position for preventing the card lock from being shifted to the first position.

The relative positional relationship of the oblong hole defined adjacent to the slot with respect to the card lock is of importance. Specifically, when the engaging tip of the theft prevention tool is inserted in the oblong hole and the inner lock member is rotated into the locked position, the outer lock member needs to abut against the card lock shifted to the second position. Since the theft prevention tool is locked when the outer lock member abuts against the card lock, the theft prevention tool alone is effective to prevent the card inserted in the slot and the information processing apparatus from being stolen.

The above and other objects, features, and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 7A to 7C through 11A to 11C are views of a lock mechanism for locking the theft prevention tool shown in FIG. 4.

DESCRIPTION OF THE PREFERRED EMBODIMENTS

Figure 1A:
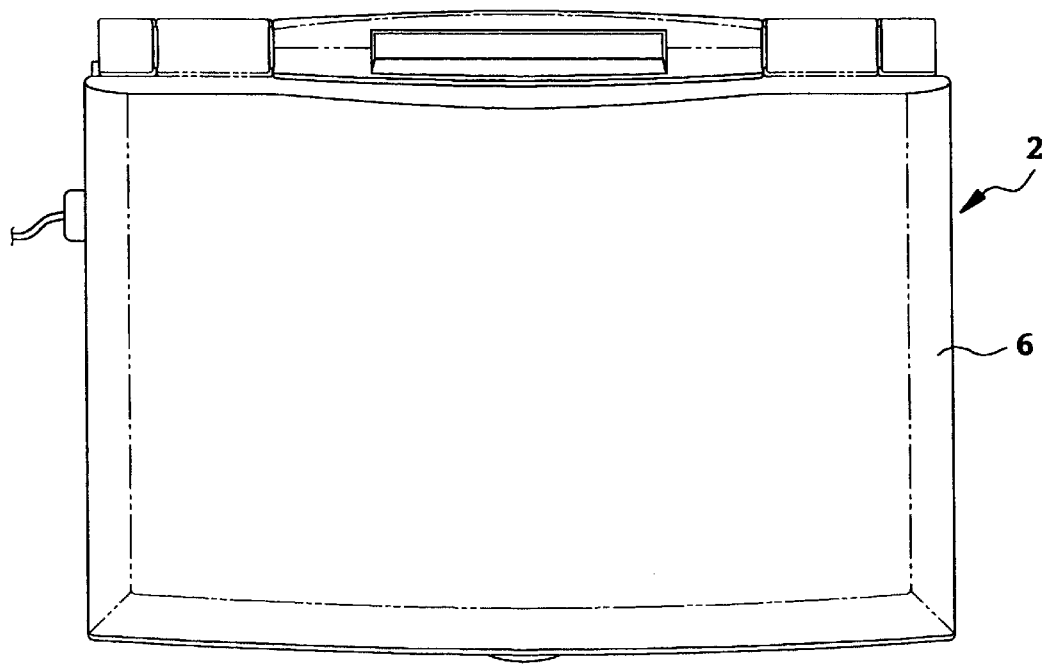
FIG. 1A is a plan view of a notebook personal computer.
Figure 1B:
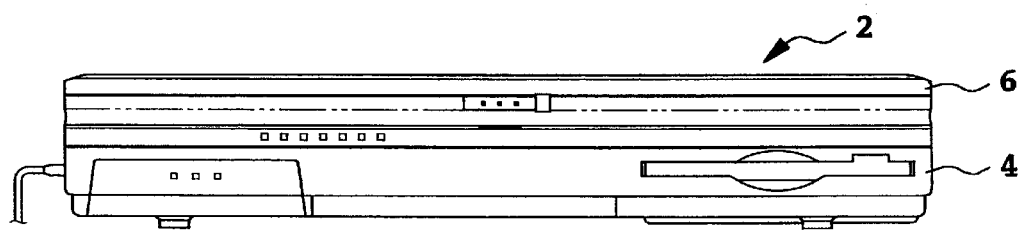
FIG. 1B is a front elevational view of the notebook personal computer.
Figure 1C:
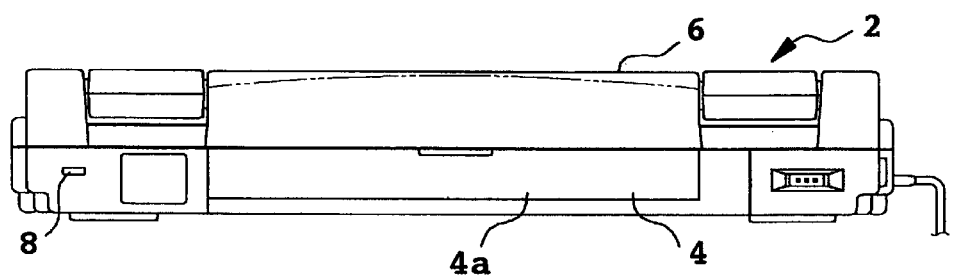
FIG. 1C is a rear elevational view of the notebook personal computer.

FIGS. 1A through 1C show a notebook personal computer 2 to which a theft prevention mechanism according to the present invention is applicable.

The notebook personal computer 2 comprises a main body 4 and a display unit 6 angularly movably mounted on the main body 4. As shown in FIG. 1C, the main body 4 includes a housing 4a which has an oblong hole 8 defined in a rear panel thereof for engaging a theft prevention mechanism (described later on).

Figure 2A:
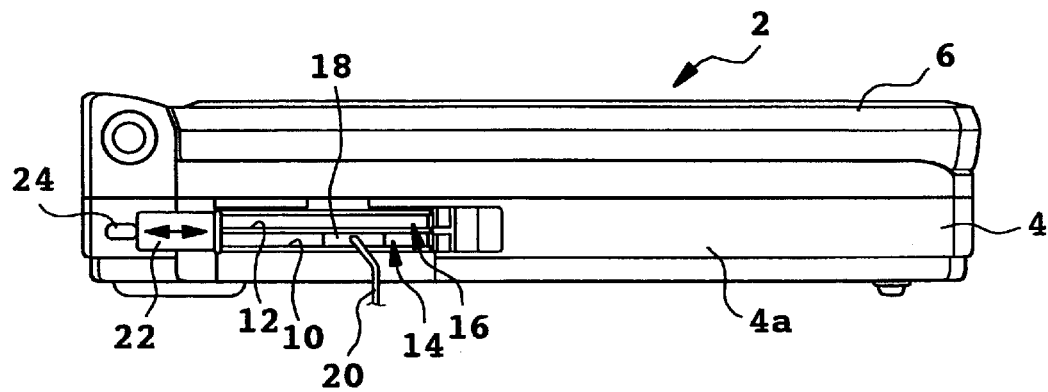
FIG. 2A is a side elevational view of the notebook personal computer with a card lock in a first position.

As shown in FIG. 2A, the notebook personal computer 2 has two slots 10, 12 defined in a left-hand side of the housing 4a for insertion of PC cards. PC cards 14, 16 are inserted respectively in the slots 10, 12. A connector 18 is detachably connected to the PC card 14, which is electrically connected to a communication unit or the like (not shown) via a cable 20 coupled to the connector 18. A similar connector (not shown) is also detachably connected to the PC card 16.

Figure 2B:
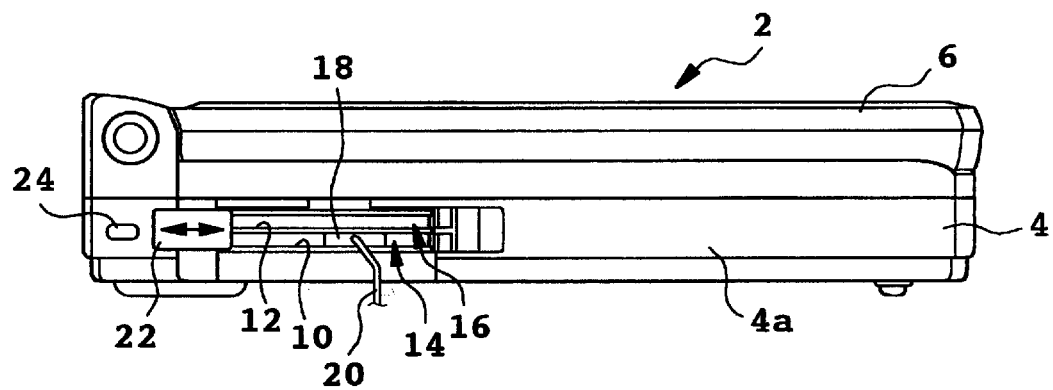
FIG. 2B is a side elevational view of the notebook personal computer with the card lock in a second position.

A card lock 22 is slidably mounted on the left-hand side of the housing 4a for movement between a first position shown in FIG. 2A in which the card lock 22 allows the PC cards 14, 16 to be inserted into the respective slots 10, 12 and a second position shown in FIG. 2B in which the card lock 22 prevents the inserted PC cards 14, 16 from being removed from the respective slots 10, 12. The housing 4a also has an oblong hole 24 defined in the left-hand side thereof adjacent to the card lock 22 for engaging a theft prevention tool 26 (see FIGS. 2 and 3). The oblong hole 24 is of the same shape as the oblong hole 8 shown in FIG. 1C, and the oblong holes 24, 8 are used for the same purpose.

Figure 2C:
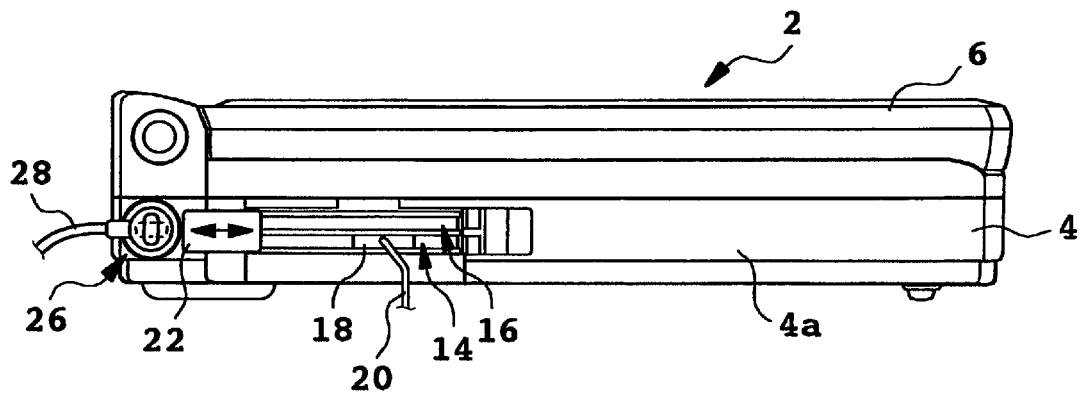
FIG. 2C is a side elevational view of the notebook personal computer with a theft prevention tool being locked.

The relative positional relationship of the oblong hole 24 with respect to the card lock 22 is of importance. Specifically, when the card lock 22 is in the first position as shown in FIG. 2A, the theft prevention tool 26 cannot engage in the oblong hole 24. When the card lock 22 is shifted to the second position as shown in FIG. 2B, the theft prevention tool 26 can engage in the oblong hole 24, as shown in FIG. 2C. If the theft prevention tool 26 which is engaging in the oblong hole 24 is locked, the card lock 22 is prevented from moving into the first position by the theft prevention tool 26, and is locked in the second position.

Figure 3:
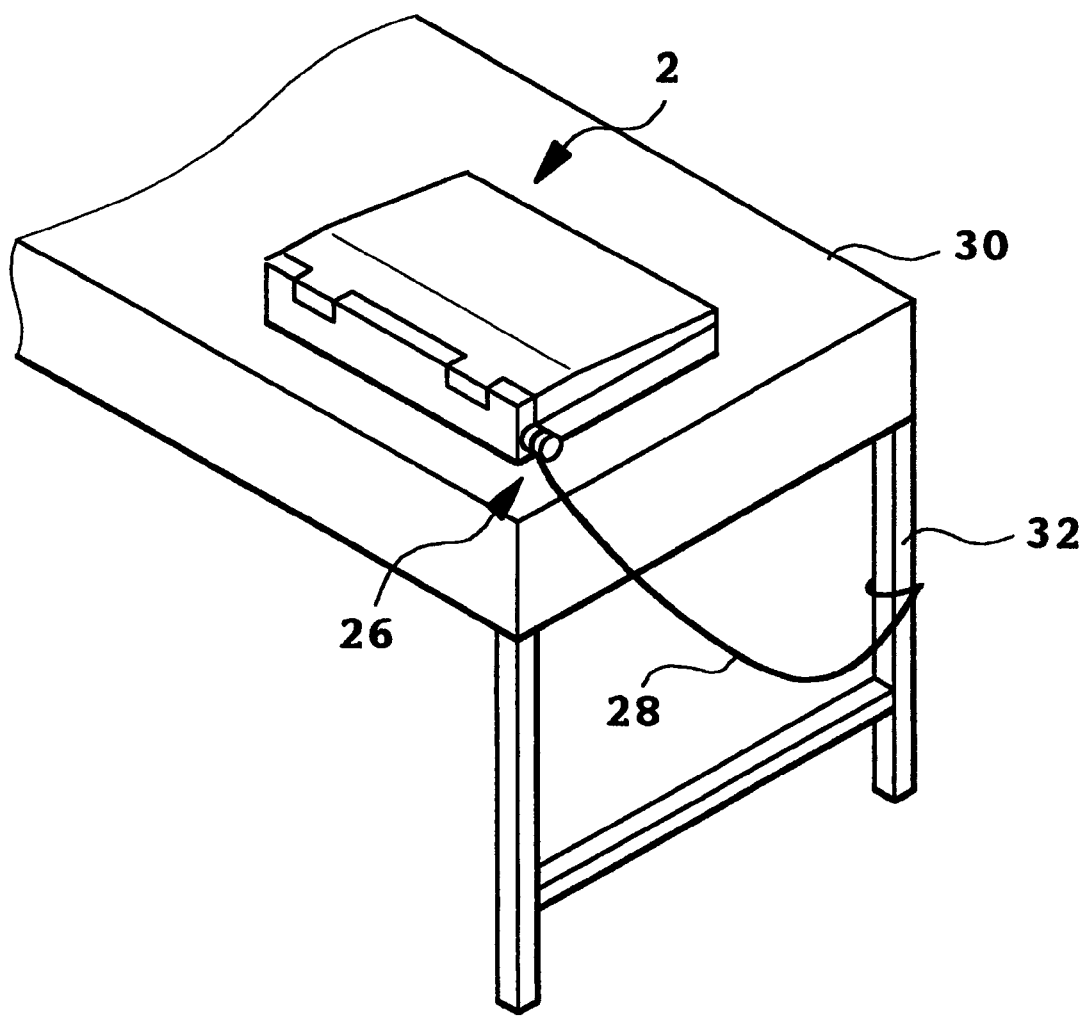
FIG. 3 is a fragmentary perspective view showing the manner in which a theft prevention mechanism according to the present invention is in use.

FIG. 3 shows the manner in which the theft prevention mechanism according to the present invention is in use. In FIG. 3, the notebook personal computer 2 is placed on a desk 30. The theft prevention tool 26 is brought into engagement in the oblong hole 24 and is locked, and a strap 28 of the theft prevention tool 26 is joined to a leg 32 of the desk 30, whereupon the notebook personal computer 2 is effectively prevented from being stolen.

Figure 4:
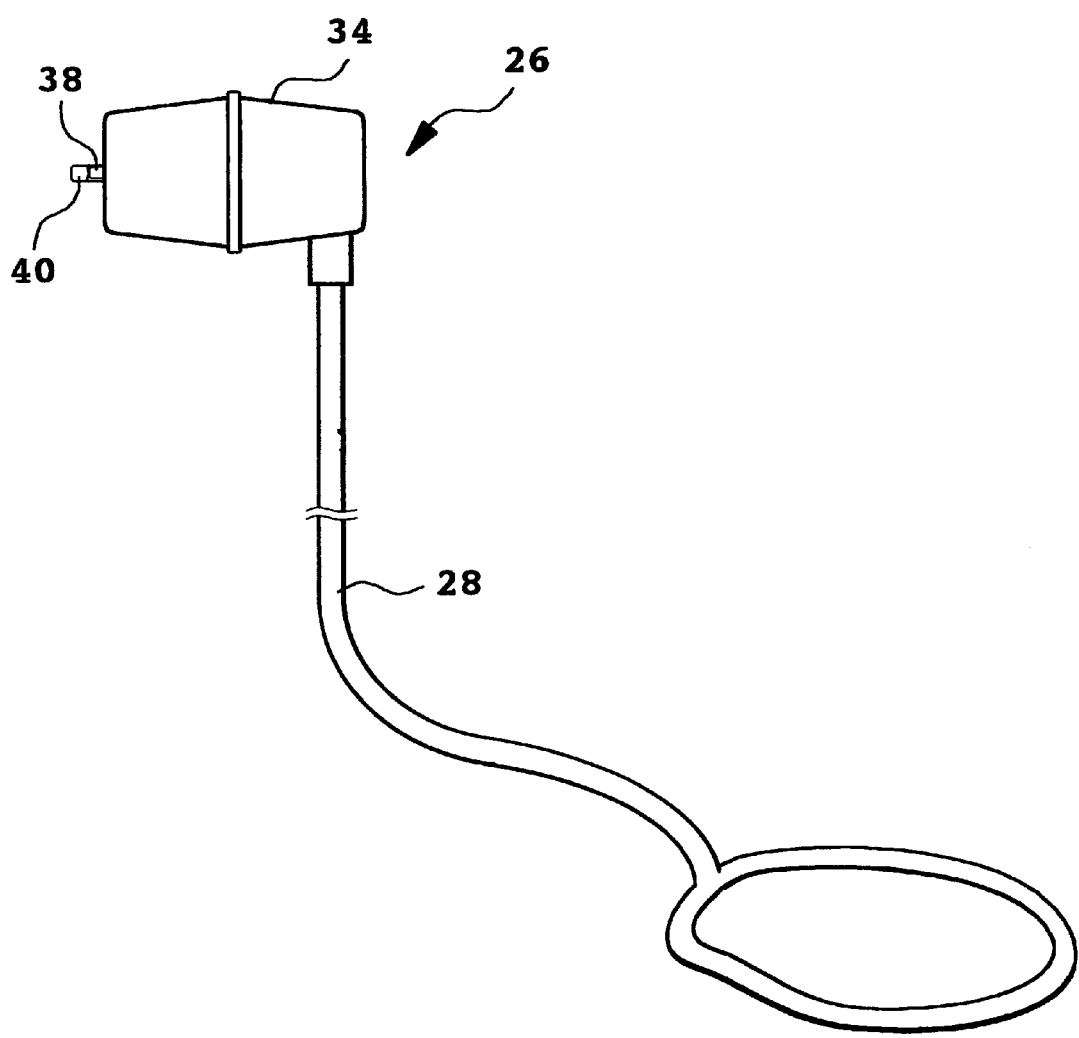
FIG. 4 is a front elevational view of the theft prevention tool.
Figure 5A:
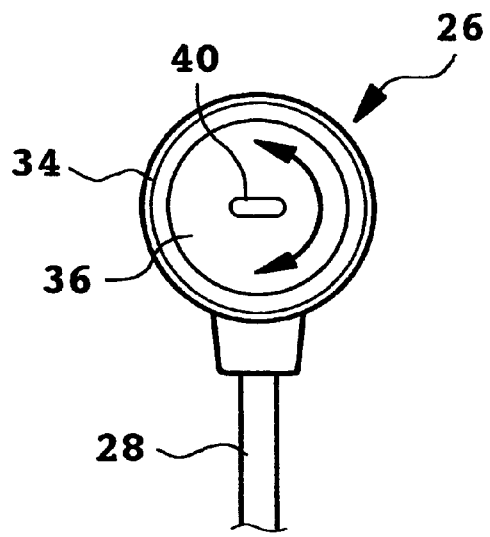
FIG. 5A is a left-hand side elevational view of the theft prevention tool shown in FIG. 4.
Figure 5B:
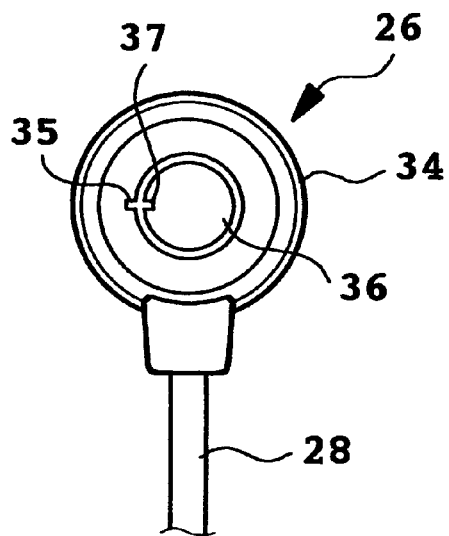
FIG. 5B is a right-hand side elevational view of the theft prevention tool shown in FIG. 4.

Structural details and operation of the theft prevention tool 26 will be described in detail below. The theft prevention tool 26 is shown in plan in FIG. 4, and fragmentarily show in side elevation in FIGS. 5A and 5B. As shown in FIGS. 5A and 5B, the theft prevention tool 26 comprises an outer lock member 34 and an inner lock member 36 rotatably inserted in the outer lock member 34 for rotation between a locked position and an unlocked position. The strap 28 is joined to the outer lock member 34.

An engaging tip 40 is integrally formed with the inner lock member 36 with a smaller-diameter neck 38 interposed therebetween. The engaging tip 40 is similar in shape to the oblong holes 8, 24, but slightly smaller than the oblong holes 8, 24 so that the engaging tip 40 can be inserted into the oblong holes 8, 24. As shown in FIG. 5B, the outer lock member 34 has a recess 35 defined therein and the inner lock member 36 has a recess 37 defined therein. The recess 35 has its bottom progressively shallower toward the inner end thereof. The inner lock member 36 is inserted in the outer lock member 34 such that the inner lock member 36 can move a distance of about 2 to 3 mm to the left in FIG. 4.

Figure 6:
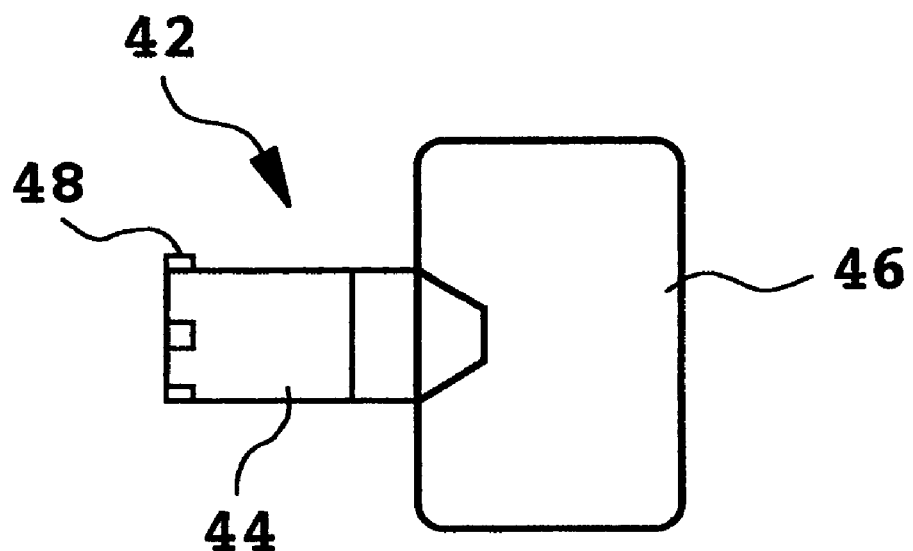
FIG. 6 is a front elevational view of a key.

FIG. 6 shown in front elevation a key 42 for locking and unlocking the theft prevention tool 26. The key 42 comprises a cylindrical member 44 and a grip plate 46 fixed to the cylindrical member 44. The cylindrical member 44 has a tooth 48 radially movably mounted thereon. In FIG. 6, the tooth 48 projects radially outwardly from the outer surface of the cylindrical member 44. When pressed downwardly, the tooth 48 projects radially inwardly into the cylindrical member 44.

Figure 7A:
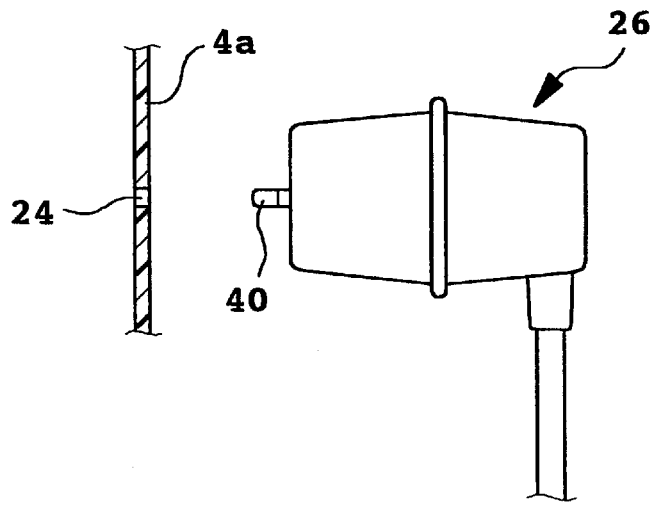
Figure 7B:
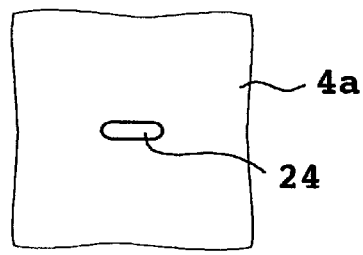
Figure 7C:
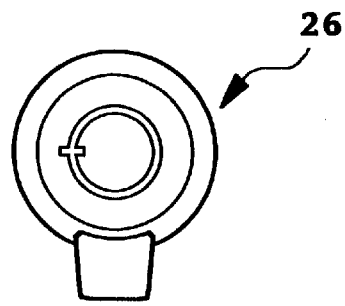

A lock mechanism for the theft prevention tool 26 will be described in detail below with reference to FIGS. 7A to 7C through 11A to 11C. FIG. 7A shows in front elevation the theft prevention tool 26 with the housing 4a of the main body 4 being shown in cross section. FIG. 7B shows the oblong hole 24 in left-hand side elevation, and FIG. 7C shows the theft prevention tool 26 in right-hand side elevation. FIGS. 8A to 8C through 11A to 11C similarly show the theft prevention tool 26, the housing 4a, and the oblong hole 24.

Figure 8A:
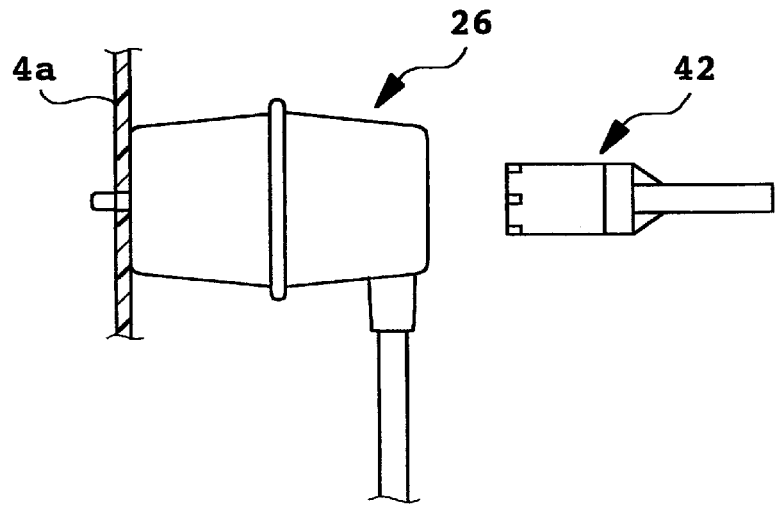
Figure 8B:
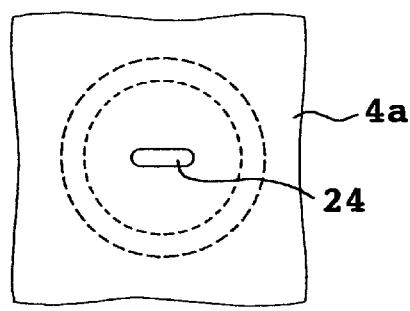
Figure 8C:
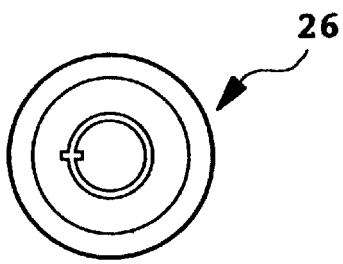
Figure 9A:
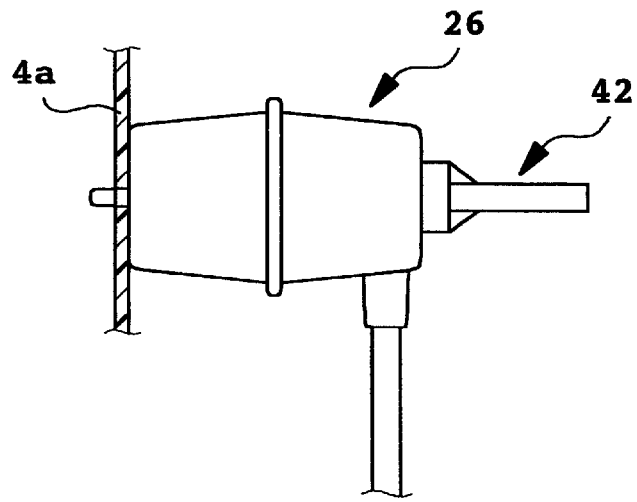
Figure 9B:
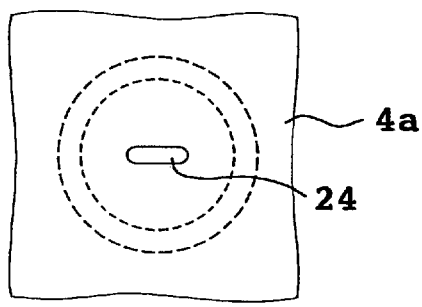
Figure 9C:
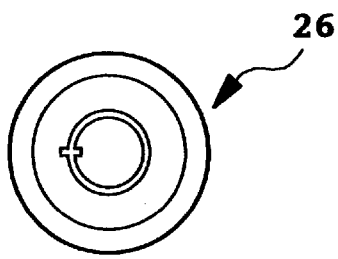

First, the theft prevention tool 26 is brought near the oblong hole 24 as shown in FIG. 7A, and the engaging tip 40 is inserted into the oblong hole 24 as shown in FIG. 8A. Then, as shown in FIG. 9A, the key 42 is held against the theft prevention tool 26, and pressed against the inner lock member 36, which is moved a distance of 2 to 3 mm to the left in FIG. 9A. Since the recess 35 has its bottom progressively shallower toward the inner end thereof, the tooth 48 of the key 42 is pressed radially inwardly and engages in the recess 37 in the inner lock member 36.

Figure 10A:
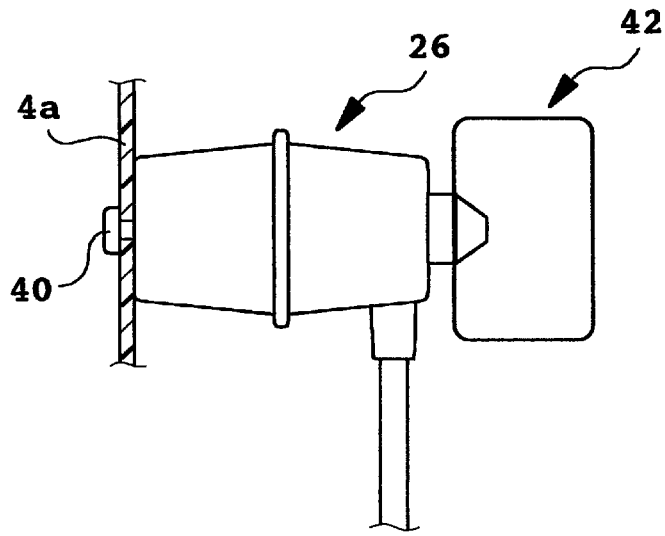
Figure 10B:
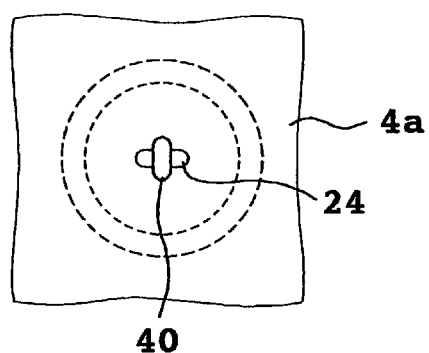
Figure 10C:
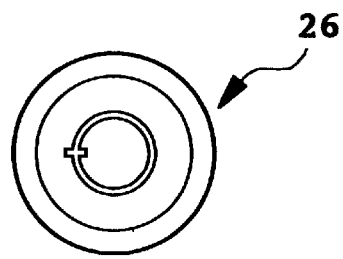

When the key 42 is then turned about 90° clockwise, the inner lock member 36 is also turned about 90° clockwise, thus locking the theft prevention tool 26, as shown in FIGS. 10A and 11A. With the theft prevention tool 26 being locked, since the longitudinal axis of the engaging tip 40 extends substantially perpendicularly to the longitudinal axis of the oblong hole 24, as shown in FIGS. 10B and 11B, the engaging tip 40 will not be pulled out of the oblong hole 24. When the strap 28 of the theft prevention tool 26 is then connected to a desk leg or the like, as shown in FIG. 3, the notebook personal computer 2 is effectively prevented from being stolen.

As described above with reference to FIG. 2C, insofar as the engaging tip 40 of the theft prevention tool 26 is inserted in the oblong hole 24 thereby to lock the theft prevention tool 26, the card lock 22 shifted to the second position abuts against the outer lock member 34 of the theft prevention tool 26. Therefore, the card lock 22 is locked in the second position. Since the PC cards 14, 16 are held in position by the card lock 22, the PC cards 14, 16 are prevented from being pulled out of the respective slots 10, 12, and hence are effectively prevented from being stolen.

With the theft prevention mechanism according to the present invention, the card lock 22 and the oblong hole 24 are kept in such a predetermined relative positional relationship that the portable personal computer 2 and the PC cards 14, 16 are effectively prevented from being stolen by the use of the theft prevention tool 26. While the portable personal computer has been described by way of example, the present invention is also applicable to a desktop personal computer if it is equipped with a PC card slot for preventing the desktop personal computer itself and a PC card inserted therein from being stolen.

The present invention offers the advantage that not only an information processing apparatus but also a card such as a PC card can be prevented from being stolen by a simple arrangement.

What is claimed is:

1. A theft prevention mechanism for use with an information processing apparatus, comprising:
   a main body of the information processing apparatus having a slot for insertion of a card therein;
   a card lock slidably mounted on said main body for sliding movement between a first position in which said card lock allows the card to be inserted into said slot and a second position in which said card lock prevents the card inserted in said slot from being removed from said slot;
   a theft prevention tool for being attached to said main body for preventing said main body from being stolen; and
   a theft prevention tool receiver disposed on said main body adjacent to said card lock;
   the arrangement being such that when said theft prevention tool is received by said theft prevention tool receiver, said theft prevention tool abuts against said card lock slided to said second position to prevent the card lock from sliding to said first position.

2. A theft prevention mechanism according to claim 1, wherein said theft prevention tool has a strap.

3. A theft prevention mechanism according to claim 1, further comprising:
   a card inserted in said slot;
   the arrangement being such that when said theft prevention tool is received by said theft prevention tool receiver, said theft prevention tool prevents both said information processing apparatus and said card from being stolen.

4. A theft prevention mechanism for use with an information processing apparatus, comprising:
   a main body of the information processing apparatus having a slot for insertion of a card therein;
   a card lock slidably mounted on said main body for sliding movement between a first position in which said card lock allows the card to be inserted into said slot and a second position in which said card lock prevents the card inserted in said slot from being removed from said slot;
   an oblong hole defined in said main body adjacent to said card lock; and
   a theft prevention tool having an outer lock member, an inner lock member rotatably inserted in said outer lock member for rotation between a locked position and an unlocked position, an engaging tip integrally formed with said inner lock member and smaller than and similar in shape to said oblong hole, and a strap connected to said outer lock member;
   the arrangement being such that when said engaging tip is inserted in said oblong hole and said inner lock member is rotated into said locked position, said engaging tip is prevented from being removed from said oblong hole, and said outer lock member abuts against said card lock shifted to said second position for preventing said card lock from being shifted to said first position.

5. A theft prevention mechanism according to claim 4, further comprising:
   a card inserted in said slot;
   the arrangement being such that when said engaging tip of the theft prevention tool is inserted in said oblong hole and said inner lock member is rotated into said locked position, said theft prevention tool prevents both said information processing apparatus and said card from being stolen.

6. A theft prevention mechanism according to claim 4, wherein said card comprises a PC card.

7. A theft prevention mechanism according to claim 4, wherein said information processing apparatus comprises a portable information processing apparatus.

8. An apparatus comprising:
   a main body of the apparatus having a insertion part for insertion of a device therein;
   a lock mounted on said main body for movement between a first position in which said lock allows the device to be inserted into said insertion part and a second position in which said lock prevents the device, inserted in said insertion part, from being removed from said insertion part; and
   a theft prevention tool receiver to receive a theft prevention tool for preventing said apparatus from being stolen, the theft prevention tool being disposed on the main body adjacent to said lock such that when said theft prevention tool is received and the lock is in the second position, said theft prevention tool prevents the lock from moving to said first position.

9. An apparatus according to claim 8, wherein said theft prevention tool receiver is disposed on the main body such that when said theft prevention tool is received by said theft prevention tool receiver, said theft prevention tool prevents both said device and said apparatus from being stolen.

10. An apparatus according to claim 8, wherein said lock is slidably mounted on said main body for sliding movement between the first position in which said lock allows the device to be inserted into said insertion part and the second position in which said lock prevents the device, inserted in said insertion part, from being removed from said insertion part.

11. Apparatus according to claim 10, wherein said theft prevention tool receiver is disposed on said main body adjacent to said lock such that when said theft prevention tool is received by said theft prevention tool receiver, said theft prevention tool abuts against said lock slided to said second position to prevent the lock from sliding to said first position.

12. An apparatus according to claim 11, wherein said insertion part is a slot.

13. An apparatus according to claim 11, wherein said insertion part is a slot for insertion of a card.

14. A theft prevention mechanism for use with an apparatus, comprising:

a main body of the apparatus having an insertion part for insertion of a device therein;

a lock mounted in said main body for movement between a first position in which said lock allows the device to be inserted into said insertion part and a second position in which said lock prevents the device, inserted in said insertion part, from being removed from said insertion part;

a theft preventing tool for being attached to said main body for preventing said main body from being stolen; and a theft prevention tool receiver disposed on main body adjacent to said lock such that when said theft prevention tool is received by said theft prevention tool receiver, said theft prevention tool prevents the lock, in the second position, from moving to said first position.

15. A theft prevention mechanism according to claim 14 wherein said theft prevention tool receiver is disposed on said main body to retain said theft prevention tool in a locking relation such that said theft prevention tool prevents both said device and said apparatus from being stolen.

16. A theft prevention mechanism according to claim 14, wherein said lock is slidably mounted on said main body for sliding movement between the first position in which said lock allows the device to be inserted into said insertion part and the second position in which said lock prevents the device, inserted in said insertion part, from being removed from said insertion part.

17. A theft prevention mechanism according to claim 16, wherein said theft prevention tool receiver is disposed on said main body adjacent to said lock such that when said theft prevention tool is received by said theft prevention tool receiver, said theft prevention tool abuts against said lock, slided to said second position, to prevent the lock from sliding to said first position.

18. A theft prevention mechanism according to claim 17, wherein said insertion part is a slot.

19. A theft prevention mechanism according to claim 17, wherein said insertion part is a slot for insertion of a card.

* * * * *